United States Patent [19]

Shimizu et al.

[11] Patent Number: 5,294,366

[45] Date of Patent: Mar. 15, 1994

[54] CARBOXYLATE COMPOUNDS, LIQUID CRYSTAL COMPOSITIONS CONTAINING SAID COMPOUNDS AND LIQUID CRYSTAL ELEMENT

[75] Inventors: Toyozi Shimizu, Ichihara; Hideo Yamaoka, Kimitsu; Shinichi Nishiyama, Kimitsu; Shoichi Miyakoshi, Kimitsu; Tooru Yamanaka, Kimitsu; Nobuyuki Doi, Kimitsu, all of Japan

[73] Assignee: Mitsui Petrochemical Industries, Ltd., Tokyo, Japan

[21] Appl. No.: 758,413

[22] Filed: Sep. 4, 1991

Related U.S. Application Data

[63] Continuation of Ser. No. 567,742, Aug. 15, 1990, abandoned.

[30] Foreign Application Priority Data

Aug. 18, 1989 [JP] Japan ................... 1-212484
Oct. 17, 1989 [JP] Japan ................... 1-269310
Oct. 17, 1989 [JP] Japan ................... 1-269311
Oct. 17, 1989 [JP] Japan ................... 1-269312

[51] Int. Cl.$^5$ ............... C09K 19/32; C09K 19/20; C07C 69/76; G02F 1/13
[52] U.S. Cl. ............... 252/299.62; 252/299.67; 560/65; 560/73; 560/102; 359/103
[58] Field of Search ............... 252/299.62, 299.67; 560/73, 65, 102; 359/103

[56] References Cited

U.S. PATENT DOCUMENTS

| | | | |
|---|---|---|---|
| 4,340,498 | 7/1982 | Sugimori | 252/299.5 |
| 4,438,268 | 3/1984 | Zaschke et al. | 544/315 |
| 4,600,528 | 7/1986 | Eidenschink et al. | 252/299.61 |
| 4,680,137 | 7/1987 | Isoyama et al. | 252/299.62 |
| 4,753,752 | 6/1988 | Raynes et al. | 252/299.65 |
| 4,834,907 | 5/1989 | Inoue et al. | 252/299.65 |
| 4,866,199 | 9/1989 | Shibata et al. | 560/65 |
| 4,879,059 | 11/1989 | Hanyu et al. | 252/299.4 |
| 4,886,619 | 12/1989 | Janulis | 252/299.1 |
| 4,921,632 | 5/1990 | Nakamura et al. | 252/299.1 |
| 4,923,633 | 11/1990 | Gray et al. | 252/299.66 |
| 5,061,399 | 10/1991 | Jenner et al. | 252/299.62 |
| 5,110,496 | 5/1992 | Mogamuya et al. | 252/299.66 |
| 5,110,497 | 5/1992 | Suzuki et al. | 252/299.65 |
| 5,110,498 | 5/1992 | Suzuki et al. | 252/299.66 |
| 5,160,662 | 11/1992 | Satoh et al. | 252/299.61 |

FOREIGN PATENT DOCUMENTS

| | | |
|---|---|---|
| 0332409 | 9/1989 | European Pat. Off. |
| 0332456 | 9/1989 | European Pat. Off. |
| 0339987 | 11/1989 | European Pat. Off. |
| 0341922 | 11/1989 | European Pat. Off. |
| 0401961 | 12/1990 | European Pat. Off. |
| 0413585 | 2/1991 | European Pat. Off. |
| 0422996 | 4/1991 | European Pat. Off. |
| 1067829 | 4/1986 | Japan ............ 350/350 S |
| 62-10045 | 1/1987 | Japan . |
| 3148237 | 6/1988 | Japan ............ 350/350 S |
| 3-106850 | 5/1991 | Japan . |
| WO8706577 | 11/1987 | PCT Int'l Appl. |
| 2084576 | 4/1982 | United Kingdom ...... 560/100 |

OTHER PUBLICATIONS

Y. Suzuki, et al., Liquid Crystals, vol. 6, No. 2, Aug. 1989, pp. 167–174.

Primary Examiner—Robert L. Stoll
Assistant Examiner—C. Harris
Attorney, Agent, or Firm—Sherman and Shalloway

[57] ABSTRACT

In accordance with the present invention, there are provided carboxylate compounds and liquid compositions thereof represented by the following formula (A)

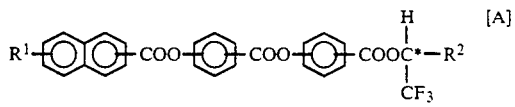

wherein $R^1$ represents one group selected from the group consisting of alkyl group having 6 to 18 carbon atoms, alkoxy group having 6 to 18 carbon atoms and halogenated alkyl group of 6 to 18 carbon atoms, C* represents an asymmetric carbon atom, and $R^2$ represents a group represented by the following formula (A)—$(CH_2)_m$—$CH_3$ or (B)—$(CH_2)_n$—$COOR_3$ wherein m represents an integer of 2 to 6, n represents an integer of 0 to 5, and $R^3$ represents alkyl group having 1 to 10 carbon atoms.

16 Claims, 4 Drawing Sheets

CARBOXYLATE COMPOUNDS, LIQUID CRYSTAL COMPOSITIONS CONTAINING SAID COMPOUNDS AND LIQUID CRYSTAL ELEMENT

This application is a continuation of application Ser. No. 07/567,742, filed Aug. 15, 1990 now abandoned.

FIELD OF THE INVENTION

This invention relates to novel carboxylate (carboxylic acid ester) compounds and liquid crystal compositions containing said compounds.

In another aspect, this invention relates to liquid crystal elements comprising novel carboxylate compounds described above and a process for the preparation thereof.

BACKGROUND OF THE INVENTION

CRT devices have heretofore been used most widely as display devices of office appliances.

In the field of appliances, such as office appliances having display devices, there is an increasing demand in recent years for miniaturing or weight saving appliances or enlarging or thinning the screen of display devices. On that account, in place of conventional CRT devices, various new types of display devices have been developed with the view of answering to uses thereof or demands therefor. For instance, display devices such as liquid crystal display, plasma display, LED display, EL display and ECD display have been developed.

Of these display devices mentioned above, liquid crystal display basically has such a function that electric signals are given to switching elements comprising a liquid crystal compound, wherein the liquid crystal compound present in said switching elements is changed in its state, thereby to control the shielding and transmission of light and develop the electrical signals on the display device. Such liquid crystal display device as illustrated above has already been put to practical use not only as a display device of the aforementioned office appliances but also as a display device of digital watch or portable game and, at the same time, has come to be used recently as a display device of moving picture such as small-sized television.

In the above-mentioned display devices using liquid crystal compounds, various driving methods are already known. For example, as the driving method of liquid crystal display presently used, there is a TN (twisted nematic) mode. This TN mode is to carry out display by utilization of dielectric anisotropy of the molecule in the nematic phase of the liquid crystal compound, wherein the display is driven by energy proportional to the multiple of the electrical field given from outside ($f \propto E^2$).

In the switching elements of liquid crystal adopting this TN mode, however, there is involved such problems that in order to change the image being displayed, the driving time is prolonged, because the position of the molecule of the liquid crystal compound in the element must be changed, and also the voltage necessary for changing the position of the molecules of the liquid crystal compound, that is, the power consumption becomes large. In such switching elements as mentioned above, there is also such a problem that because the switching threshold value characteristic to the element is not so good, when the position of the molecules of the liquid crystal compound is changed at high speed and changeover operation is intended to carry out, leakage of voltage may occur and voltage may be given to the molecules which are not to be given the voltage and therefore contrast of the images may markedly decrease Because of the above-mentioned problems associated with the conventional display method relying on TN mode as mentioned above, the display devices utilizing TN mode are not suitable particularly for large screen display devices or display devices for moving pictures such as small-sized digital television.

Furthermore, there are being used display devices utilizing STN (super twisted nematic) mode in which the switching threshold value and the like as mentioned above have been improved. By virture of utilization of such STN mode, a contrast of the display devices certainly improves because of its improved threshold value characteristics.

However, this display method is identical with the method utilizing TN mode in that both methods utilize the dielectric anisotropy, and accordingly because of their long switching time, the display devices utilizing this STN mode do not have sufficient characteristics as required for large screen display devices or devices for moving picture such as small-sized digital television.

In contrast thereto, R. B. Meyer et al. suggested in 1975 that organic compounds synthesized by them exhibit ferroelectric properties, and further suggested in 1980 that element comprising cells having a small gap filled with these ferroelectric liquid crystal compounds may be used as optical switching elements, i.e., display devices.

In distinction to switching elements utilizing TN mode or STN mode, the switching elements using such ferroelectric liquid crystal compounds as mentioned above are able to function as switching elements only by changing the direction of molecular orientation of said liquid crystal compounds and hence the switching time required for operating the switching elements is markedly shortened. Further, because a value of $Ps \times E$ obtained from a spontaneous polarization (Ps) of the ferroelectric liquid crystal compound and an intensity of the electric field (E) applied is an effective energy output for changing the direction of molecular orientation of said liquid crystal compound, power consumption required therefor can be markedly minimized. Such ferroelectric liquid crystal compounds as mentioned above are suitable particularly as display devices for large screen or moving picture, because they have two steady states depending upon the direction of electric field applied, that is, bistability and also very favorable switching threshold value characteristics.

When these ferroelectric liquid crystal compounds are intended for use in optical switching elements, they are required to have such characteristics as an operating temperature in the vicinity of ambient temperature (room temperature), a wide operating temperature zone, a high switching speed and an appropriate switching threshold value voltage. Particularly, of these characteristics, the operating temperature range is especially important when the ferroelectric liquid crystal compounds are used in optical switching elements However, there are many ferroelectric liquid crystal compounds which are unusable for optical switching elements, because their operating temperature range does not agree with their service temperature range, in spite of the fact that other characteristics of said compounds are excellent [refer for example, to R. B. Meyer et al. J. de Phys., Vol. 36L, p. 69 (1975) and a paper reported by M. Taguchi and T. Harada, "Proceedings of Eleventh Conference on Liquid Crystal" p. 168 (1985)].

OBJECT OF THE INVENTION

The present invention is intended to solve such problems associated with the prior arts as mentioned above and an object of the present invention is to provide novel carboxylate compounds which can be used as liquid crystal compounds capable of forming display devices having such excellent characteristics as a wide operating temperature range, a high switching speed, an appropriate switching threshold value voltage and markedly low power consumption.

A further object of the present invention is to provide liquid crystal compositions which contain carboxylate compounds as above-mentioned and have excellent characteristics and their uses.

SUMMARY OF THE INVENTION

The novel carboxylate compounds of the present invention are represented by the following formula [A].

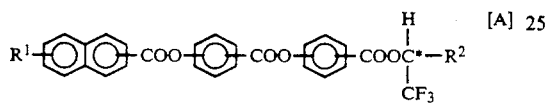

In formula [A], $R^1$ represents one member selected from the represents consisting of alkyl group of 6 to 18 carbon atoms, alkoxy group of 6 to 18 carbon atoms and halogenated alkyl group of 6 to 18 carbon atoms, $C^*$ represent an asymmetric carbon atom, and $R^2$ represents a group having the following formula [B] or [C]

$$-(CH_2)_m-CH_3 \quad \ldots [B]$$

$$-(CH_2)_n-COOR^3 \quad \ldots [C]$$

wherein m represents an integer of 2 to 6, n represents an integer of 0 to 5, and $R^3$ represents alkyl groups of 1 to 10 carbon atoms or halogenated alkyl group of 1 to 10 carbon atoms.

The novel carboxylate compounds can be used as liquid crystal compounds.

The liquid crystal compositions of the present invention are characterized by that they contain the above-mentioned carboxylate compounds.

Further, the first liquid crystal element according to the present invention comprises a cell composed of two transparent substrates, each substrate being provided with a transparent electrode on one surface thereof, and a liquid crystal material, said substrates being arranged so that the transparent electrodes are faced to each other with a gap and the gap being filled with said liquid crystal material, characterized in that an orientation controlling film (layer) composed of a polyimide is provided on the inner surface of the least one substrate and said liquid crystal material is the carboxylate compound represented by the formula [A].

Furthermore, the liquid crystal element according to the present invention comprises a cell composed of two transparent substrates, each substrate being provided with a transparent electrode on one surface thereof, and a liquid crystal material, said substrates being arranged so that the transparent electrodes face to each other with a gap and the gap being filled with said liquid crystal material, characterized in that an orientation controlling film is provided on the inner surface of each of the two sheets of the substrates, the orientation directions of said two orientation controlling films are nearly parallel with each other but in the opposite direction from each other and said liquid crystal material is the carboxylate compound represented by the formula [A].

A process for the preparation of the liquid crystal element according to the present invention comprising a cell composed of two transparent substrates, each substrate being provided with a transparent electrode on one surface thereof, and a liquid crystal material, said substrates being arranged so that the transparent electrodes face each other with a gap there between which is filled with said liquid crystal material, which process is characterized by that an orientation controlling film is provided on the inner surface of each of said two substrates in such an arrangement that the orientation directions of said orientation controlling films are almost parallel with each other but in the opposite direction from each other, the gap between the substrates of the cell is filled with a liquid crystal compound component containing the carboxylate compound represented by the formula [A], and the liquid crystal compound contained in the cell is heated to not lower than a temperature at which the compound exhibits an isotropic phase and said compound is then cooled at a cooling rate of 2° C./min or below to not higher than a temperature at which said compound exhibits a liquid crystal.

By virture of using the carboxylate compounds represented by the formula [A] as the liquid crystal compounds, there can be obtained various devices having such excellent characteristics as a wide operating temperature zone, a high switching speed, markedly low power consumption and stable constrast.

DETAILED DESCRIPTION OF THE INVENTION

Figure 1:
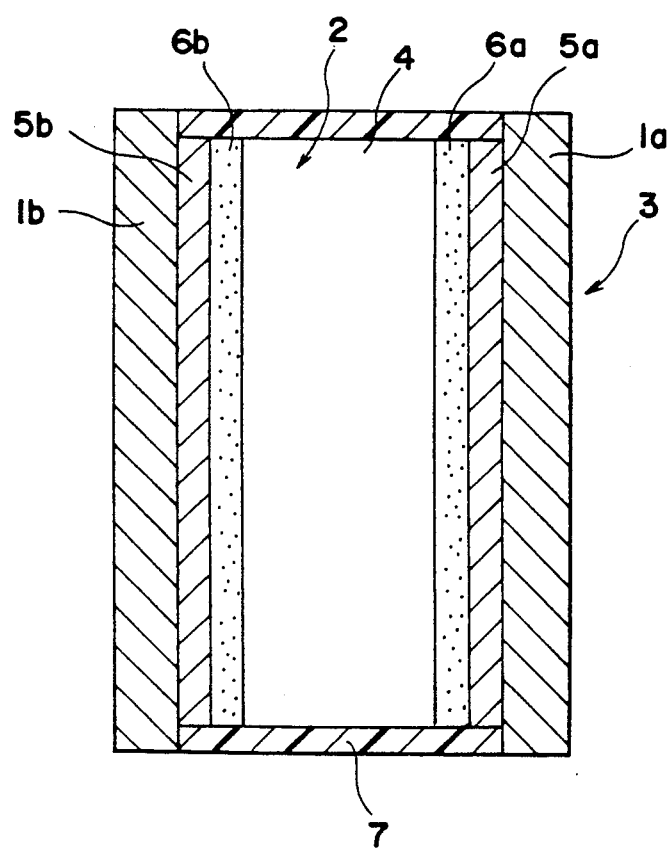
FIG. 1 is a sectional view of a liquid crystal element according to the present invention.

The carboxylate compounds, the liquid crystal compositions containing said compounds and the liquid crystal elements according to the present invention are illustrated below in detail.

First, the carboxylate compounds of the present invention are illustrated below.

The present carboxylate compounds are represented by the following formula [A].

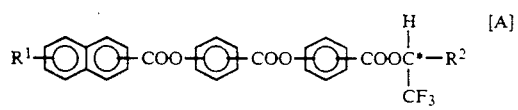

In the formula [A], $R^1$ represents one member selected from the groups consisting of alkyl group having 6 to 18 carbon atoms, alkoxy groups having 6 to 18 carbon atoms and halogenated alkyl group having 6 to 18 carbon atoms, C* represents an asymmetric carbon atom, and $R^2$ represents a group represented by the following formula [B] or [C].

—(CH$_2$)$_m$—CH$_3$ ... [B]

—(CH$_2$)$_n$—COOR$_3$ ... [C]

In the above formulas [B] and [C], m represents an integer of 2 to 6, n represents an integer of 0 to 5, and $R^3$ represents alkyl group having 1 to 10 carbon atoms or halogenated alkyl group having 1 to 10 carbon atoms.

The alkyl group of 6 to 18 carbon atoms represented by $R^1$ in the formula [A] may be any of straight-chain, branched and alicyclic alkyl groups. The molecules of the carboxylates wherein $R^1$ is a straight-chain alkyl group exhibit excellent liquid crystal properties because of their upright structure. Examples of such straight-chain alkyl groups include hexyl, heptyl, octyl, decyl, dodecyl, tetradecyl and octadecyl.

Examples of the halogenated alkyl group of 6 to 18 carbon atoms represented by $R^1$ include radicals where at least part of hydrogen atoms of the above-mentioned alkyl group represented by $R^1$ is substituted by halogen atoms such as F, Cl, Br and I.

Examples of the alkoxy groups of 6 to 18 carbon atoms represented by $R^1$ include alkoxy groups having the above-mentioned alkyl portion. Concrete examples of the alkoxy groups include hexoxy, heptoxy, octyloxy, decyloxy, dodecyloxy, tetradecyloxy, heptadecyloxy and octadecyloxy.

Of the above-mentioned compounds, compounds where an alkoxy group, exhibit excellent liquid crystal properties.

In the above formula [A], $R^2$ represents a group represented by the following formula [B] or [C].

—(CH$_2$)$_m$—CH$_3$ ... [B]

—(CH$_2$)$_n$—COOR$_3$ ... [C]

In the above formula [B], m represents an integer of 2 to 10. Concrete examples of the group represented by the above formula [B] include propyl, butyl, pentyl, hexyl, heptyl, octyl, nonyl and decyl. Of these compounds, those where m is an integer of 4 to 6 are particularly useful as liquid crystal compounds. Compounds having the group represented by the following formula [B-1], that is, compounds having a hexyl group where m is 5 are most useful as liquid crystal compounds.

—(CH$_2$)$_5$—CH$_3$ ... [B-1]

In the above formula [C], n represents an integer of 1 to 5. Concrete examples of the groups represented by the formula [C] include alkoxycarbonyl, alkoxycarbonylmethyl, 2-alkoxycarbonylethyl, 3-alkoxycarbonylpropyl, 4-alkoxycarbonylbutyl and 5-alkoxycarbonylpentyl groups. Of these compounds, those where n is an integer of 1 to 3 are particularly useful as liquid crystal compounds. Compounds having the group represented by the following formula (C-1), that is, compounds where n is 1 (methylene) and $R^3$ is ethyl are most useful as liquid crystal compounds.

—CH$_2$—COO—C$_2$H$_5$ ... [C-1]

The above-mentioned group represented by $R^2$ is attached to an asymmetric carbon atom. To the asymmetric carbon atom are attached a hydrogen atom and trifluoromethyl group (—CF$_3$). The remainder of the bonds of the asymmetric carbon atom are attached to phenylene group through ester linkage.

Examples of the above phenylene group in the formula [A] are o-phenylene, m-phenylene and p-phenylene. When the carboxylate compounds of the present invention are used particularly as liquid crystal compounds, it is preferred that molecules themselves are linear. Accordingly, p-phenylene is preferable as the phenylene group.

This phenylene group is attached to another phenylene group (the second phenylene group) through ester linkage Examples of the second phenylene group are o-phenylene, m-phenylene and p-phenylene. Similarly, when the carboxylate compounds of the present invention are used as liquid crystal compounds, it is preferred that molecules themselves are linear. Accordingly, p-phenylene is preferable as the second phenylene group.

Further, this phenylene group is attached to the naphthalene group through ester linkage.

Examples of the naphthalene group are 1,5-naphthalene, 1,6-naphthalene, 1,7-naphthalene and 2,6-naphthalene. When the carboxylate compounds of the present invention are used particularly as liquid crystal compounds, it is preferred that molecules themselves are linear. Accordingly, 2,6-naphthalene is preferable as the naphthalene group.

The naphthalene group may be substituted, for example, by alkyl of 1 to 3 carbon atoms. The liquid crystal characteristics of the carboxylate compounds are not lowered by the presence of such substituent.

Another bond of the naphthalene group is attached to $R^1$.

Accordingly, the carboxylate compounds represented by the formula [A] according to the present invention concretely include compounds represented by the following formulas [1] to [8].

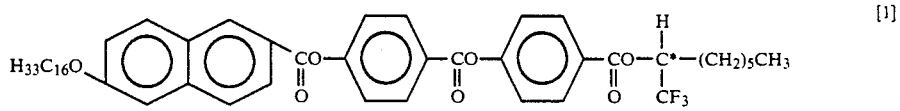
[1]

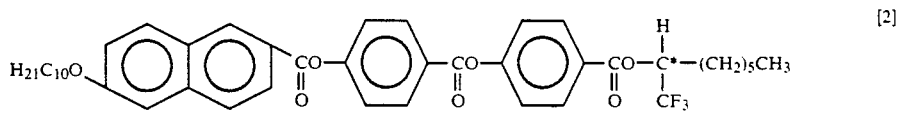
[2]

-continued
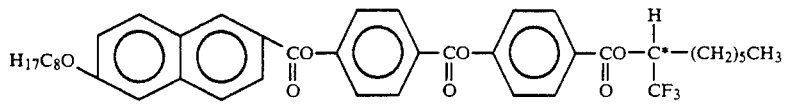
[3]
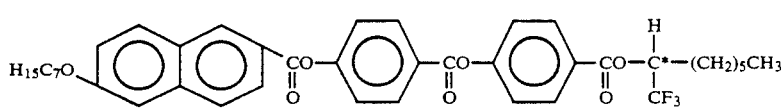
[4]
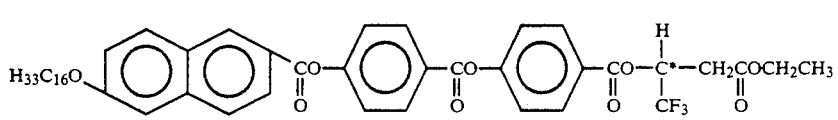
[5]
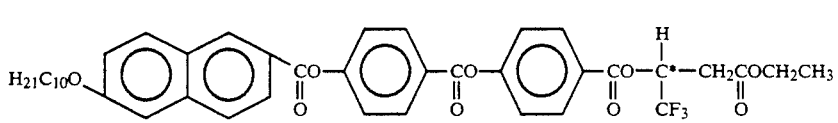
[6]
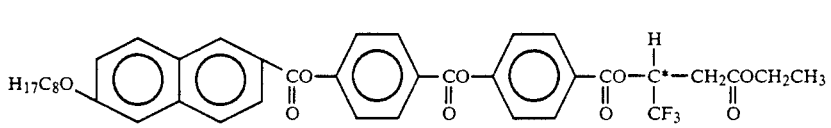
[7]
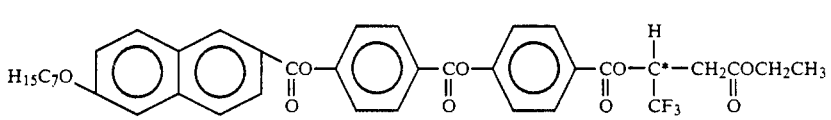
[8]
The carboxylate compounds of the present invention can be synthesized by conventional methods.
For example, the carboxylate compounds can be synthesized through such synthesis route as illustrated below. In the following synthesis example, the case where $R^1$ is alkoxy is illustrated.
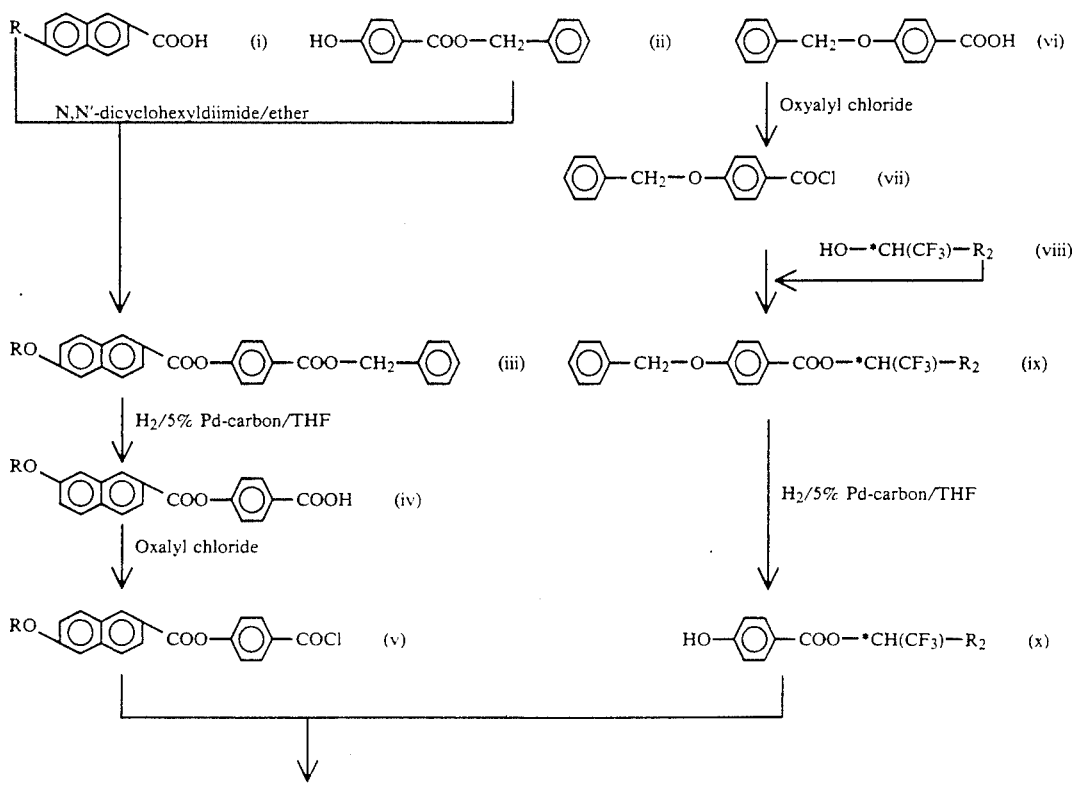

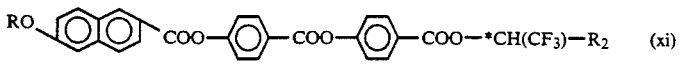

A 6-alkoxy-2-carboxynaphthalene (i) is first condensed with benzyl p-hydroxybenzoate (ii) in the presence of an esterifying agent such as N,N'-dicyclohexylcarbodiimide to obtain 4'-benzyloxycarbonylphenyl 6-alkoxynaphthyl-2-carboxylate (iii).

It is preferred that a pyridine derivative such as 4-N,N-dialkylaminopyridine is allowed to coexist in the condensation reaction.

The resulting 4'-benzyloxycarbonylphenyl 6-alkoxynaphthyl-2-carboxylate (iii) is contacted with hydrogen gas in the presence of a reduction catalyst such as a catalyst composed of palladium on carbon in a polar solvent such as tetrahydrofuran to reduce it and to thereby carry out debenzylation, thus obtaining a compound having carboxyl group at its terminal such as 4'-hydroxycarbonylphenyl 6-alkoxynaphthylcarboxylate (iv).

The thus-obtained compound having a carboxyl group at its terminal such as 4'-hydroxycarbonylphenyl 6-alkoxynaphthyl-2-carboxylate (iv) is reacted with a halogenating agent such as oxalyl chloride to obtain 4,-chloroformylphenyl 6-alkoxynaphthalene-2-carboxylate (v).

Alcohols to be reacted with the thus-obtained 4'-chloroformylphenyl 6-alkoxynaphthalene-2-carboxylate (v) can be synthesized, for example, by the following method.

In the synthesis of an alcohol to be reacted with the ester (v), 4-benzyloxybenzoic acid (vi) is first reacted with a halogenating agent such as oxalyl chloride to obtain 4-benzyloxybenzoyl chloride (vii).

The resulting 4-benzyloxybenzoyl chloride (vii) is reacted with a desired optical active alcohol (viii) to esterify it, thus obtaining the 4-benzyloxybenzoic acid ester (ix). The resulting ester (ix) is contacted with hydrogen gas in the presence of a reduction catalyst such as a catalyst composed of palladium on carbon in a polar solvent such as tetrahydrofuran, thus obtaining a compound having a hydroxyl group at its terminal such as 4-hydroxybenzoic acid ester (x).

The thus-obtained 4-hydroxybenzoic acid ester (x) is reacted with the acid chloride such as 4'-chloroformylphenyl 6-alkoxynaphthalene-2-carboxylate (v) prepared above in a reaction solvent such as methylene chloride to obtain the final product, that is, the desired carboxylate compound of the present invention.

In addition to the above-mentioned synthesis method, the carboxylate compounds of the present invention can be synthesized through the following synthesis route.

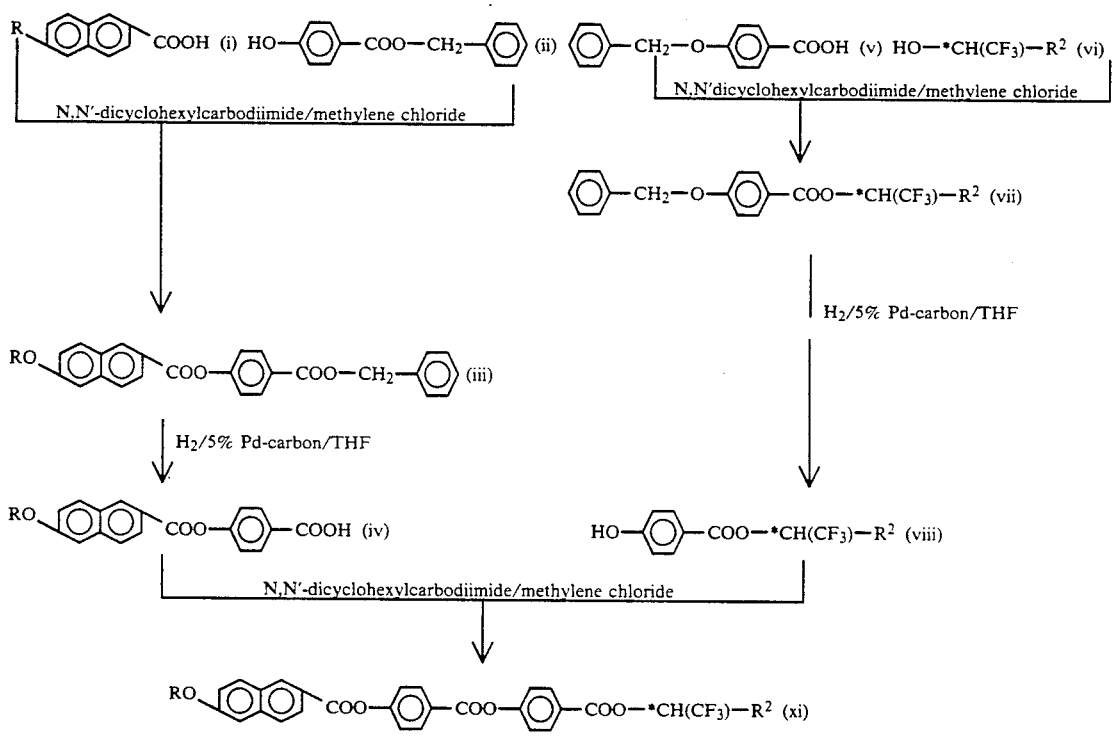

late (iv).

The thus-obtained compound having a carboxyl group at its terminal such as 4'-hydroxycarbonylphenyl 6-alkoxynaphthyl-2-carboxylate (iv) is reacted with a halogenating agent such as oxalyl chloride to obtain 4,-chloroformylphenyl 6-alkoxynaphthalene-2-carboxylate (v).

Alcohols to be reacted with the thus-obtained 4'-chloroformylphenyl 6-alkoxynaphthalene-2-carboxylate (v) can be synthesized, for example, by the following method.

In the synthesis of an alcohol to be reacted with the ester (v), 4-benzyloxybenzoic acid (vi) is first reacted with a halogenating agent such as oxalyl chloride to obtain 4-benzyloxybenzoyl chloride (vii).

The resulting 4-benzyloxybenzoyl chloride (vii) is reacted with a desired optical active alcohol (viii) to In a similar manner to that described above, a 6-alkoxy-2-carboxynaphthalene (i) is first condensed with benzyl p-hydroxybenzoate (ii) to obtain 4'-benzyloxycarbonylphenyl 6-alkoxynaphthyl-2-carboxylate (iii).

The resulting 4'-benzyloxycarbonylphenyl 6-alkoxynaphthyl-2-carboxylate (iii) is reduced to obtain a compound having a carboxyl group at its terminal such as 4'-hydroxycarbonylphenyl 6-alkoxynaphthylcarboxylate (iv).

Alcohols to be reacted with the compound having carboxyl group at its terminal such as 4'-hydroxycarbonylphenyl 6-alkoxynaphthylcarboxylate (iv) can be synthesized, for example, by the following method.

In the synthesis of an alcohol to be reacted with the above ester (iv), 4-benzyloxybenzoic acid (v) is first reacted with a desired optionally active alcohol in the presence of N,N'-dicyclohexylcarbodiimide in a solvent

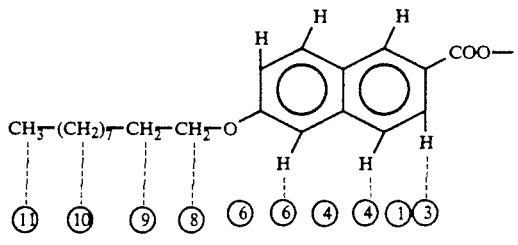

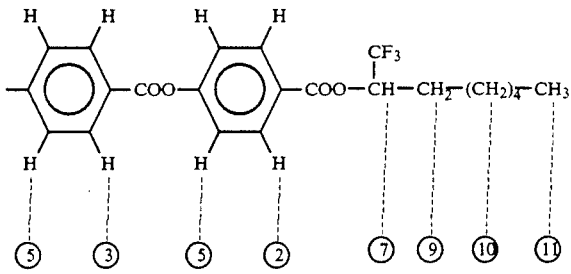

such as methylene chloride to obtain a 4-benzyloxybenzoic acid ester (vii).

The ester (vii) is then contacted with hydrogen gas in the presence of a reduction catalyst such as a catalyst composed of palladium on carbon in a polar solvent such as tetrahydrofuran to reduce it and to thereby

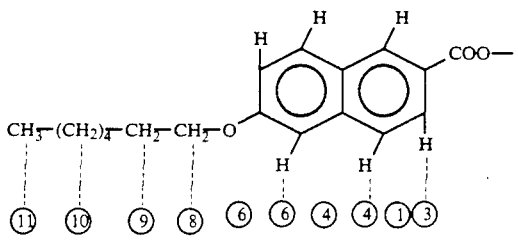

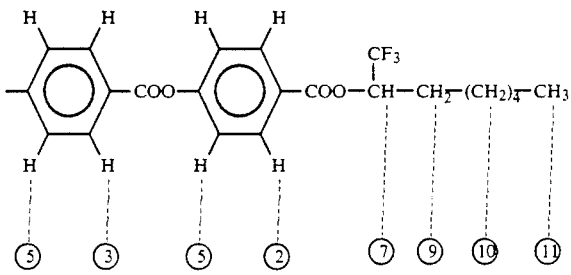

carry out debenzylation, thus obtaining a compound having a hydroxyl group at its terminal such as 4-hydroxybenzoic acid ester (viii).

The thus-obtained compound having a hydroxyl group at its terminal such as 4-hydroxybenzoic acid ester (viii) and the compound having a carboxyl group

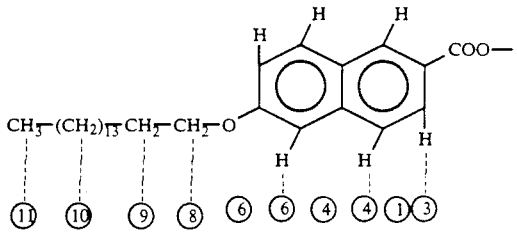

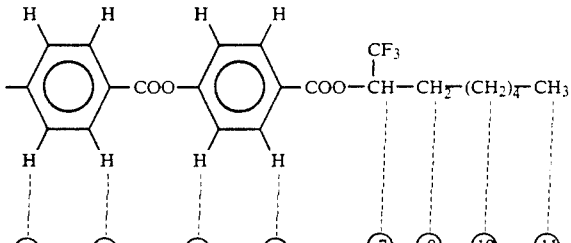

at its terminal such as 4'-hydroxycarbonylphenyl 6-alkoxynaphthyl-2-carboxylate (iv) are subjected to an esterification reaction in the presence of, for example, N,N'-dicyclohexylcarbodiimide in a solvent such as methylene chloride to obtain the carboxylate compound of the present invention.

Figure 2:
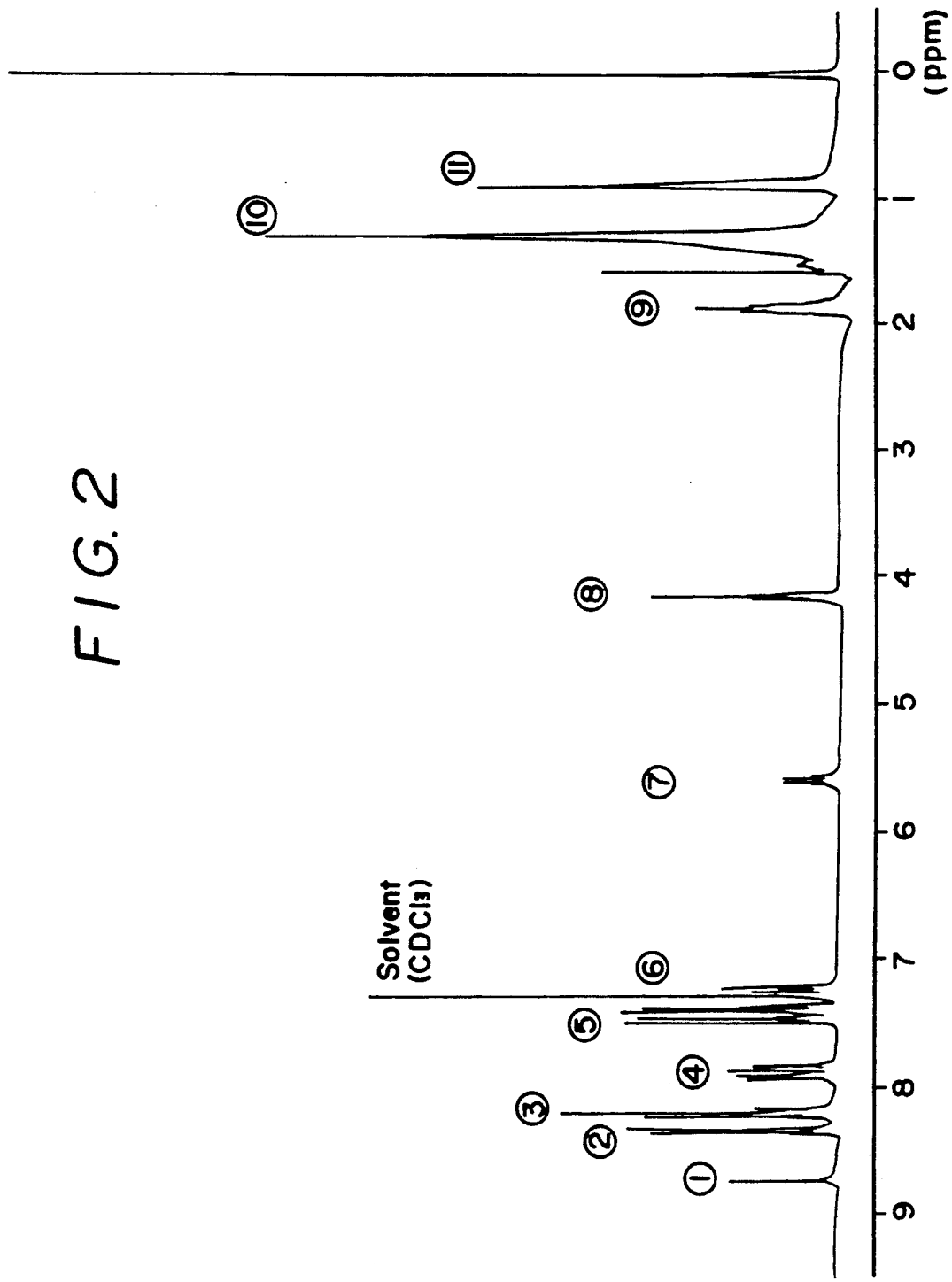
FIG. 2 is a chart showing $^1$H-NMR spectrum of R-1'-trifluoromethylheptyl ester of 4-[4'-(6'-n-decyloxy-2'-naphthoyloxy)-benzoyloxy]-benzoic acid.

FIG. 2 is a chart showing $^1$H-NMR spectrum of R-1'-trifluoromethylheptyl ester of 4-[4'-(6'-n-decyloxy-2'-naphthoyloxy)-benzoyloxy]-benzoic acid represented by the following formula, which is one of the naphthylcarboxylic acid ester derivatives of the present invention which can be prepared by the above-mentioned methods.

The above numerals (1) to (11) indicate the numbers of hydrogen atoms in the above formula, and the numbers correspond to numbers given to peaks of FIG. 2.

Figure 3:
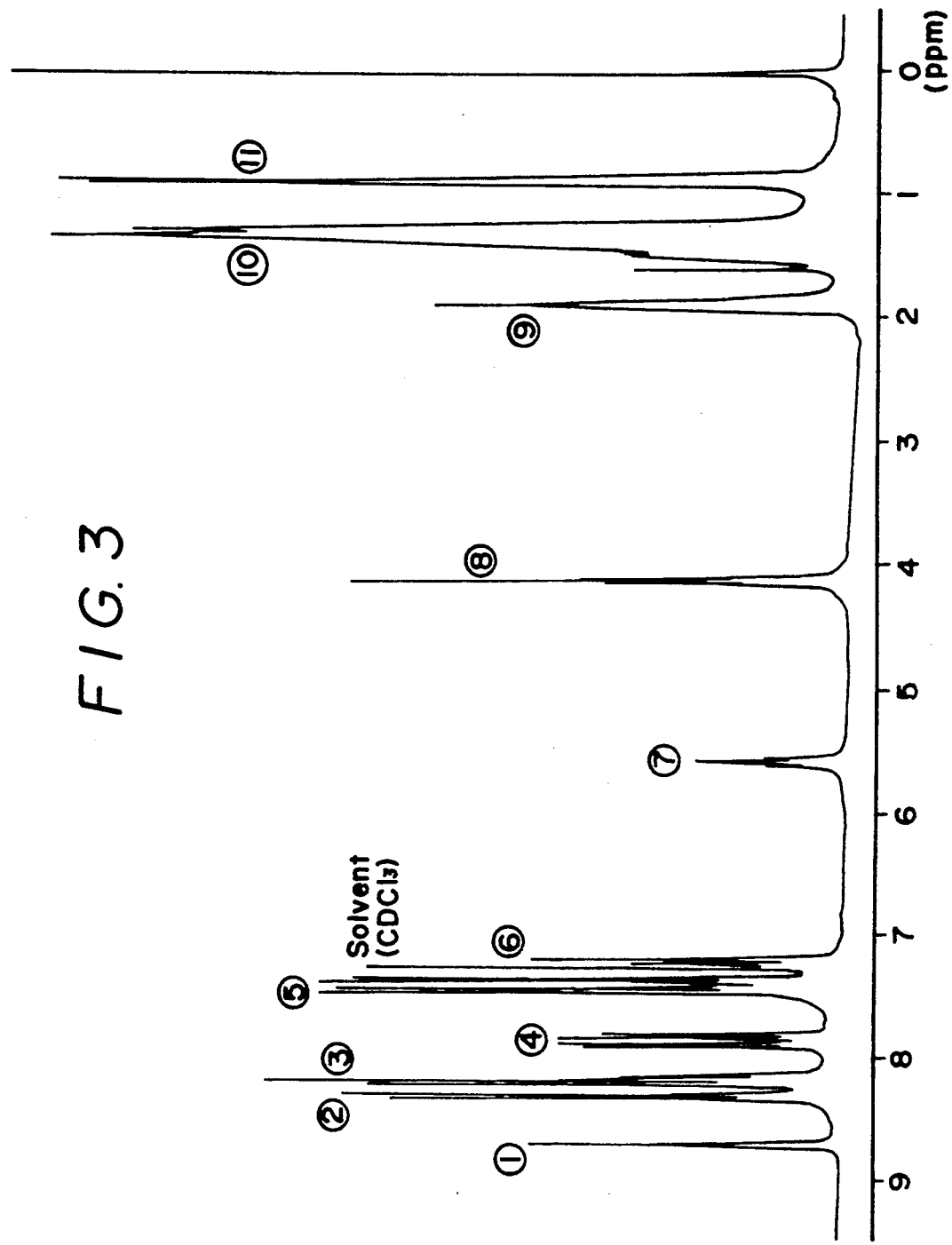
FIG. 3 is a chart showing $^1$H-NMR spectrum of R-1'-trifluoromethylheptyl ester of 4-[4'-(6'-n-heptyloxy-2'-naphthoyloxy)-benzoyloxy]-benzoic acid.

FIG. 3 is a chart showing $^1$H-NMR spectrum of R-1'-trifluoromethylheptyl ester of 4-[4'-(6'-n-heptyloxy-2'-naphthoyloxy)benzoyloxy]-benzoic acid.

The above numerals (1) to (11) indicate the numbers of hydrogen atoms in the above formula and the numbers correspond to numbers given to peaks of FIG. 3.

Figure 4:
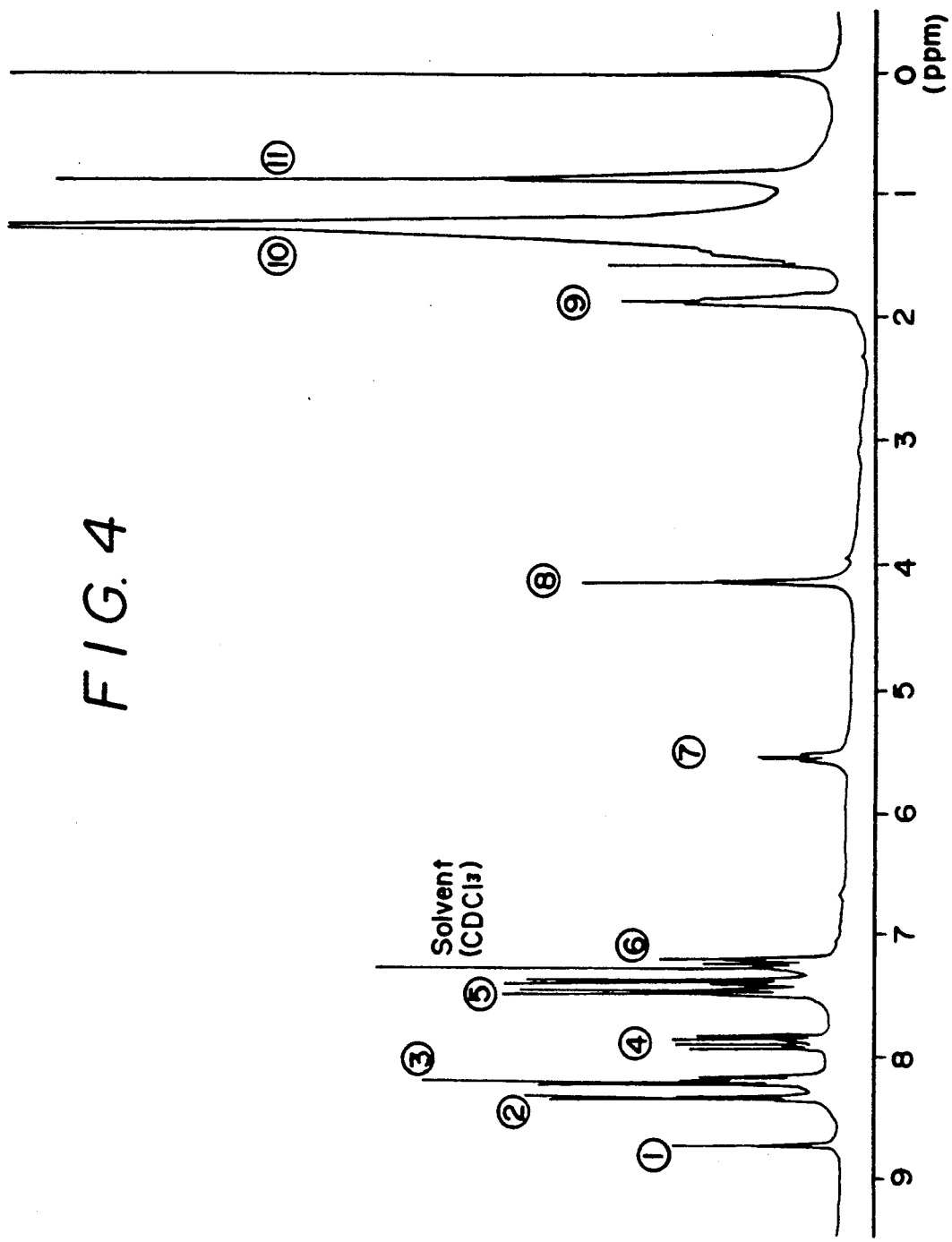
FIG. 4 is a chart of $^1$H-NMR spectrum of R-1'-trifluoromethylheptyl ester of 4-[4'-(6'-n-hexadecyloxy-2'-naphthoyloxy)-benzoyloxy]-benzoic acid.

FIG. 4 is a chart showing $^1$H-NMR spectrum of R-1'-trifluoromethylheptyl ester of 4-[4'-(6'-n-hexadecyloxy-2'-naphthoyloxy)-benzoyloxy]-benzoic acid.

The above numerals indicate the numbers of hydrogen atoms in the above formula and the numbers correspond to numbers given to peak of FIG. 4.

The carboxylate compounds represented by the formula [A], prepared in the manner described above may be used, for example, as liquid crystal compounds. Particularly, the carboxylate compounds having optical activity can be used as ferroelectric liquid crystal compounds.

Of these carboxylate derivatives, compounds where $R^1$ is alkoxy of 6 to 18 carbon atoms and $R^2$ is a group of the formula [B] wherein m is an integer of 4 to 6, preferably 5, and compounds where $R^1$ is alkoxy of 6 to 18 carbon atoms and $R^2$ is a group of the formula [C] wherein n is an integer of 1 to 3, preferably 1, are useful as liquid crystal compounds. Further, of these compounds, the compound where both phenylene groups are in the form of p-phenylene and naphthalene group is in the form of 2,6-naphthalene, represented by the following formula [2] exhibits particularly excellent liquid crystal characteristics.

The phase transition temperatures of the liquid crystal compounds represented by the following formula [1], [2] and 4] are shown in Table 2. In the following Table, etc., Cry represents a crystal phase, SmC* represents a chiral smectic C phase, SmA represents a smectic A phase and Iso represents an isotropic liquid.

Japanese Patent L-O-P Publn. No. 107216/1981 and 118744/1984).

Ferroelectric liquid crystal compounds which can be used in such display devices as mentioned above are compounds assuming any one of a chiral smectic C phase, a chiral smectic F phase and a chiral smectic G phase, or any one of a chiral smectic H phase, a chiral smectic I phase and a chiral smectic J phase or a chiral smectic K phase, but display devices using these liquid crystal compounds have a large response speed (slow) except the compound assuming a chiral smectic C phase (SmC* phase). Accordingly, driving with a chiral smectic C phase having a small response speed (quick) is conventionally considered to be advantageous in practical use.

TABLE 1

| Compound | Phase transition temperature [°C.] | | |
|---|---|---|---|
| | Cry—SmC* | SmC*—SmA | SmA—Iso |
| [1] | 32 | 109 | 133 |
| [2] | 60 | 134 | 164 |
| [4] | 73 | 125 | 183 |

In the liquid crystal compounds of the present invention, many compounds assume smectic phase over a wide temperature range as shown in Table 1.

When conventional liquid crystal compounds singly are used, there are scarcely known liquid crystal compounds assuming smectic phase over a wide temperature range as in the compounds of the present invention.

The liquid crystal compounds of the present invention assume smectic phase over a wide temperature range, and also optical switching elements containing such liquid crystal compounds are excellent in high-speed response.

The liquid crystal compounds of the present invention may be used alone, but are used preferably as liquid crystal compositions in admixture with other liquid crystal compounds. For example, the liquid crystal compounds of the present invention can be used as a principal ingredient in a chiral smectic liquid crystal composition, or as an auxiliary ingredient in a liquid crystal composition containing other compounds assuming smectic phase as a principal ingredient.

Namely, when voltage is applied to ferro-electric liquid crystal compounds, an optical switching phenomenon is induced. By utilizing this phenomenon, displace devices having good response can be prepared (see, However, the ferroelectric liquid crystal compounds of the present invention can be used not only in the chiral smectic C phase, but also in the smectic A phase by utilizing a method for driving display elements in the smectic A phase which has been previously proposed by the present inventors (Japanese Patent Application No. 157808/1987). Accordingly, liquid crystal compositions having a wider liquid crystal temperature range and high speed electric-optical correspondence can be obtained by mixing the liquid crystal compounds of the present invention with other liquid crystal compounds.

For example, liquid crystal compositions exhibiting a liquid crystal phenomenon over a wide temperature range can be obtained by mixing the carboxylate compounds of the present invention with other liquid crystal compounds as shown in Table 2.

Namely, when R-1'-trifluoromethylheptyl ester of 4-[4'-(6'-n-heptyloxy-2'-naphthoyloxy)-benzoyloxy]-benzoic acid (A-1) as the novel carboxylate compound of the present invention is mixed with the compound (Cr-1) having a liquid crystal temperature range of from $-6°$ C. to $-13°$ C., represented by the following formula (Cr-1), a crystal liquid composition having a liquid crystal temperature range of from 96° C. to 34° C. or below (namely, the range of liquid crystal temperature being over 100° C.) can be obtained as shown in Table 2.

TABLE 2

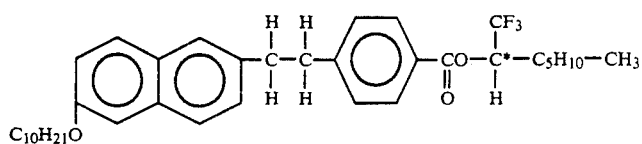
(Cr-1)

| Compound or composition | Phase transition temperature | | | |
|---|---|---|---|---|
| | Cry. | SmC* | SmA | Iso |
| (A-1) | . 73° C. | . 125° C. | . 183° C. | . |
| (A-1) 51 wt. % + (Cr-1) 49 wt. % | . 34° C. | . 52° C. | . 96° C. | . |
| (Cr-1) | . −13° C. | . | . −6° C. | . |

In Table, (A-1) repesents the following compound.

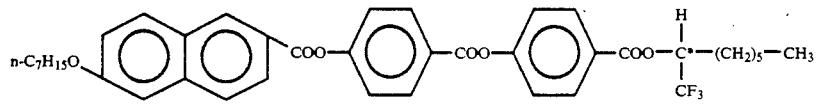

(Cr-1) represents the following compound.

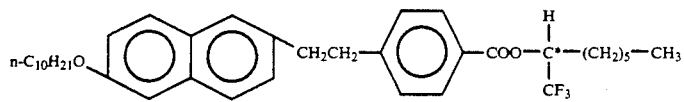

The carboxylate compounds of the present invention can be used as a principal ingredient or an auxiliary ingredient in the liquid crystal compositions of the present invention as described above. The contents of the liquid crystal compounds represented by the formula [A] in the liquid crystal compositions of the present invention can be suitably decided by taking into consideration the characteristics of the liquid crystal compound used, the viscosity and operating temperature of the compositions and purpose for which the compositions are used. The carboxylate compounds are used in the range of 1 to 99% by weight, preferably 5 to 75% by weight based on the combined weight of the liquid crystal substances in the liquid crystal composition of the present invention.

One or more of the carboxylate compounds may be used in the liquid crystal composition of the present invention.

In the present liquid crystal compositions, examples of compounds assuming a chiral smectic C phase which can be used together with the liquid crystal compounds of the formula [A], in said compositions include (+)-4'-(2'-methylbutyloxy) phenyl-6-octyloxynaphthalene-2-carboxylic acid ester, 4'-decyloxyphenyl-6-((+)-2'-methylbutyloxy)naphthalene-2-carboxylic acid ester, crystal compounds capable of constituting the present liquid crystal compositions by using them together with the aforementioned carboxylate compounds of the formula [A] include nematic liquid crystal compounds such Schiff base type liquid crystal compound as

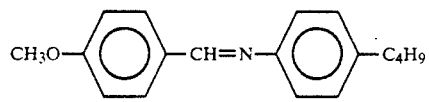

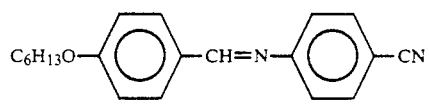

azoxy type liquid crystal compounds such

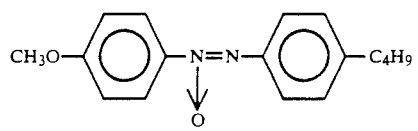

benzoic acid ester type liquid crystal compounds such as

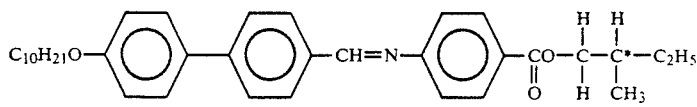

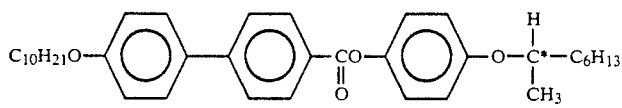

and

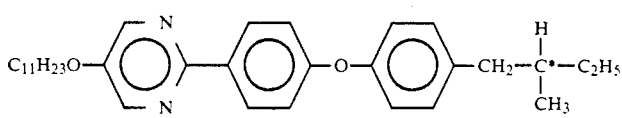

Besides the above-mentioned compounds assuming a chiral smectic C phase, moreover, examples of liquid -continued

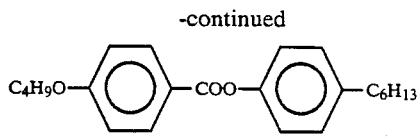

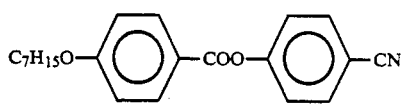

cyclohexylcarboxylic acid ester type liquid crystal compounds such as

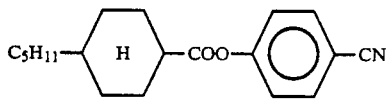

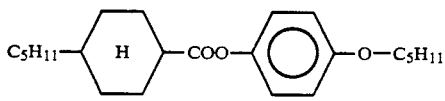

biphenyl type liquid crystal compounds such as

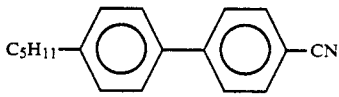

terphenyl type liquid crystal compounds such as

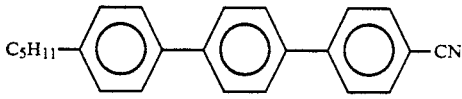

cyclohexyl type liquid crystal compounds such as

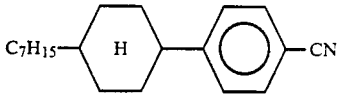

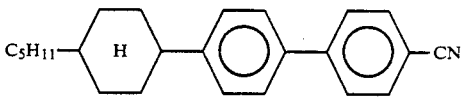

and pyridine type liquid crystal compounds such as

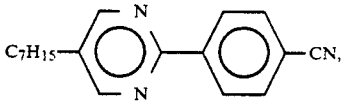

and further include cholesteric type liquid crystal compounds such as hydrochloric acid cholesterin, nonanoic acid cholesterin and oleic acid cholesterin and known smectic liquid crystal compounds.

When display elements are formed by using the liquid crystal compounds of the present invention, additives which can be incorporated into ordinary liquid crystal compounds, such as conductivity imparting agents and lifetime improving agents, may be added in addition to the carboxylate compounds and other liquid crystal compound described above. Further, dichroic dyes can be mixed with the liquid crystal compounds of the present invention when the liquid crystal compounds are used in liquid crystal elements driven by a driving system utilizing the dichroism of dyes.

The liquid crystal compositions of the present invention can be prepared by mixing the carboxylate compounds with other liquid crystal compounds and optionally additives.

The liquid crystal element of the present invention is illustrated below in detail.

The liquid crystal element comprises usually a cell 2 composed of two transparent substrates 1a, 1b made of a transparent plastic such as a polycarbonate or glass, each substrate being provided with an electrode, for example, composed of In-Sn oxide on the inner surface thereof, and a liquid crystal material charged into a space 3 formed between the transparent substrates 1a, 1b as shown in FIG. 1.

In the present invention, a transparent electrode substrate composed of a transparent electrode integrally formed on the above-mentioned substrate can be used as a substrate.

In the liquid crystal element of the present invention, an orientation-controlling film is provided on the inner surface of at least one substrate. Accordingly, the orientation-controlling film may be provided on the inner surface of only one substrate. However, it is preferred that the orientation controlling film is provided on the inner surface of each of both substrates. FIG. 1 shows an embodiment in which two sheets of orientation controlling films 6a, 6b are provided.

As the orientation controlling film, various films are usable. Of these films a polyimide film is preferable. Accordingly, when one sheet of the orientation controlling film is provided in the present invention, it is desirable that the orientation controlling film is composed of a polyimide. When two sheets of the orientation controlling films are provided, it is desirable that at least one film is composed of a polyimide and more preferably both films are composed of a polyimide.

Any of polyimides can be used without particular limitation, so long as they are polymer materials having imido linkage in the molecule. Polyimides which can be easily molded into a film are preferred. Concrete examples of the polyimides include Uprex R (a product of Ube Industries, Ltd.), Sunever 130 (a product of Nissan Chemical Industries, Ltd.), JIA-28 AL1251 (a product of Japan Synthetic Rubber Co., Ltd.), KERIMD 601 (a product of Nippon Polyimide Co., Ltd.) and L-1100 (a product of Hitachi Kasei Kogyo KK). However, polyimides are not limited to the above resins, but other polyimides can also be used in the present invention.

As stated above, the polyimides which can be used in the present invention are resins mainly composed of a polymer having imido linkage. The polyimide for use in forming the orientation controlling film of the present invention may contain other resin such as a polyamide in such an amount as not to have an adverse effect on the characteristics of the polyimide. Further, other linkages in addition to imido linkage may be allowed to exist in the polyimide, so long as the amounts of other linkages do not deteriorate the characteristics of the polyimide.

When one of the orientation controlling films is formed from a material other than the polyimide, the orientation controlling film composed of other material than the polyimide may be composed of an organic material or an inorganic material.

Examples of the orientation controlling film composed of other material than the polyamide include films composed of resins such as polyvinyl alcohol, polyamide-imide, polyester, polycarbonate, polyvinyl acetal, polyvinyl chloride, polyvinyl acetate, polyamide, polystyrene, siloxane polyimide, cellulose resin, melamine resin, urea resin, acrylic resin and electrically conductive polymer. Further, the orientation controlling film may be a cured article of cyclized rubber photoresist, phenol novolak photoresist or electron beam photoresist such as polymethyl methacrylate or epoxidized 1,4-polybutadiene. Furthermore, the orientation controlling film may be formed from an inorganic material. Examples of materials which can be used for the formation of the inorganic orientation controlling film include SiO, GeO, $Al_2O_3$, $Y_2O_5$, $ZrO_2$, $MgF_2$ and $CeF_3$.

The orientation controlling film can be formed on the inner surface of each substrate by various methods depending on materials used such as a method wherein the above-described resin is applied, e.g., by means of spin coating, a method wherein the thus-coated resin is heat-treated, a method wherein a resin film is laminated, a method wherein a photosensitive resin is applied and then irradiated with a radiation to cure it, and a method wherein an inorganic material is deposited.

The thickness of the orientation controlling film is in the range of usually 0.005 to 0.25 μm, preferably 0.01 to 0.15 μm.

In the present invention, it is desirable that the orientation directions of the orientation controlling films $6a$, $6b$ provided on the inner surfaces of said two substrates are nearly parallel to each other but in the opposite direction from each other. The orientation controlling film plays a role in orientating the aforementioned liquid crystal compounds in the desired direction.

When the orientation controlling film is provided on the inner surface of each of two substrates in such an arrangement that the orientation directions of said two sheets of the orientation controlling films are nearly parallel to each other but in the opposite direction from each other as mentioned above, the initial orientation of the liquid crystal material charged into the cell is improved and a liquid crystal element excellent in contrast, etc., can be obtained.

The orientation controlling film can be obtained by orientating a substrate film such as a polyimide film. The orientation can be made, for example, by rubbing the substrate film such as a polyimide film in a given direction with cloth such as polyamide, polyester or cotton or with paper or brush. The orientation can also be made by electron beam radiation, glow discharge or plasma radiation.

In the present invention, the gap between the substrates can be formed, for example, by putting a spacer 7 between the substrates. By virtue of putting the spacer 7, the gap 2 to be filled with the liquid crystal material can be secured and the liquid crystal material can be prevented from leaking. The gap 2 can be formed by the spacer which forms a sidewall as illustrated above. Alternatively, the gap can be formed by mixing particles (internal spacer) having a desired particle size with the liquid crystal material.

The width of the thus-formed gap between the substrates is usually 1.5 to 7 μm, preferably 1.8 to 5 μm.

In the liquid crystal element of the present invention, various thin films such as photoconductive film, light screening film, light reflecting film, etc. may be provided on the surface of the orientation controlling film.

A process for the preparation of the above liquid crystal element is illustrated below in detail.

The liquid crystal element comprising a cell composed of two transparent substrates and a liquid crystal material can be prepared in the following manner.

The orientation controlling film is provided on the inner surface of each of two substrates preferably in such as arrangement that the orientation directions of two sheets of the orientation controlling films are nearly parallel to each other but in the opposite direction from each other. The gap between the substrates in the cell is filled with a liquid crystal material containing the carboxylate compound represented by the formula [A] or a liquid crystal composition containing said craboxylate compound represented by the formula [A]. The liquid crystal compound is heated to not lower than a temperature at which said compound exhibits an isotropic phase and said compound is then cooled at a cooling temperature of not higher than 2° C./min, preferably 0.1° to 0.5 ° C./min, more preferably 0.1° to 0.2° C./min to not higher than a temperature at which said compound exhibits a liquid crystal to thereby obtain the liquid crystal element.

By cooling the cell at a cooling rate within the range specified above, there can be obtained a liquid crystal element which is excellent in initial orientation and has a liquid crystal phase composed of monodomains having no failure in orientation. The term "initial orientation" as used herein refers to the arrangement state of the liquid crystal material before the orientation vector of the liquid crystal material is changed by applying voltage to the liquid crystal element, etc.

Usually, the liquid crystal material is heated until it is molten, and the liquid crystal material in the molten state is charged (injected) into the gap of the cell whose inside is evacuated. After the gap is filled with the liquid crystal material in the manner mentioned above, the cell is usually sealed. The thus-obtained liquid crystal element is markedly excellent in contrast, etc.

The liquid crystal elements of the present invention can be used to prepare liquid crystal display devices such as white tailor type color display device, cholesteric nematic phase transition type display device and device for preventing the formation of reverse domain in TN type cell and electrooptical display devices.

Of these liquid crystal elements of the present invention, liquid crystal elements comprising a cell filled with a liquid crystal composition assuming a smectic phase can be used as memory liquid crystal elements such as heat writing display element and laser writing display element. Liquid crystal display devices or electrooptical display devices can be prepared by using such liquid crystal elements.

In addition to the above-mentioned applications, the liquid crystal elements of the present invention can be used as liquid crystal elements such as opticalswitching element (e.g., optical shutter and liquid crystal printer), piezoelectric element and collecting element. Accordingly, liquid crystal display devices or electrooptical display devices can be prepared by using such liquid crystal elements.

Namely, when a chiral smectic C phase is formed by using the liquid crystal materials of the present invention, the chiral smectic C phase exhibits bistability. Accordingly, when electric field is inverted between two stable states, optical switching and display can be conducted by using the liquid crystal element wherein said chiral smectic C phase is formed.

Further, the ferroelectric liquid crystal material assuming a chiral smectic C phase has spontaneous polarization. Hence, when voltage is once applied thereto, the cell comes to have a memory effect, even after electric field is erased. By utilizing this memory effect, a power consumption of the display device comprising the liquid crystal element can be reduced, because no continuous application of voltage is required. In this case, moreover, the contrast of the display device is stabilized and a very clear contrast can be obtained.

The switching elements using this chiral smectic C liquid crystal composition can be driven at low voltage, because switching can be performed only by changing the direction of molecular orientation of the chiral smectic liquid crystal compound and also because the primary strength of electric field applied is applied to the driving. When the switching elements are used, a high speed response of less than 50-60 ∞ seconds can be attained. Accordingly, the scanning time of each element can be greatly shortened and a large screen display (liquid crystal display device) having a number of scanning lines can be prepared. Further, since display is operated at room temperature or lower, scanning can be easily made without using any auxiliary means for temperature control.

Further, the molecules of the liquid crystal materials used in the liquid crystal elements of the present invention are tilted even in the state of a smectic A phase having no bistability when an electric field is applied. Accordingly, optical switching can be conducted by utilizing this property.

Ferroelectric liquid crystal compounds assume any one of a chiral smectic C phase, a chiral smectic F phase and a chiral smectic G phase, or any one of a chiral smectic H phase, a chiral smectic I phase and a chiral smectic J phase, or a chiral smectic K phase from the standpoint of the structures of the liquid crystal materials.

In the liquid crystal elements using these liquid crystal compounds, a response time is generally small except a chiral smectic C phase (SmC* phase). Accordingly, driving in the chiral smectic C phase having a large response speed is conventionally considered to be practically advantageous. According to the method for driving the liquid crystal elements in the smectic A phase and the display elements capable of being driven in the smectic A phase which have been previously proposed by the present inventors (see, Japanese Patent Application No. 157808/1987), however, driving can be conducted in the chiral smectic C phase as well as in the smectic A phase.

Furthermore, the liquid crystal materials used in the liquid crystal elements of the present invention exhibit two or more stable states even in liquid crystal phases such as a chiral smectic F phase having an order higher than that of the chiral smectic C phase and hence opticalswitching can be conducted in the same way as in the smectic A phase.

The following methods may be given as examples of the display method in which the present liquid crystal elements are used.

The first display method is to effect the display by placing the liquid crystal element of the present invention between two polarizing plates and applying an external electric field to the liquid crystal element to change the orientation vector of the ferroelectric liquid crystal compound, thereby effecting display by utilizing a birefringence of the two polarizing plates and of the ferroelectric liquid crystal compound.

The second display method using the liquid crystal element of the present invention comprises using a liquid crystal composition containing a dichroic dye and utilizing the dichroism of the dye. This method is to effect display by changing light absorption wavelength by means of the dye while changing the orientation direction of the molecules in the ferroelectric liquid crystal composition. In this case, dyes used are usually dichroic dyes, and examples of the dichroic dyes include azo dyes, naphthoquinone dyes, cyanine dyes and anthraquinone dyes.

The liquid crystal elements of the present invention may be applicable to commonly used display methods in addition to the above-mentioned display methods.

The liquid crystal display devices and the electrooptical display devices prepared by using the liquid crystal elements of the present invention may be driven by various driving methods, for example, electric address display such as static drive, simple matrix drive and composite matrix drive, photo-address display, heat address display and electron beam address display.

EFFECT OF THE INVENTION

The carboxylate compounds of the present invention ar novel compounds. In these compounds, trifluoromethyl group is attached to the asymmetric carbon atom, and two benzene rings and naphthalene ring are attached through ester linkages. Hence, these compounds assume the smectic phase over a wide temperature range and can be preferably used as the ferroelectric liquid crystal compounds.

When the liquid crystal compounds of the present invention are mixed with the same kinds of the liquid crystal compounds and/or different kinds of liquid crystal compounds, a lowering in the operating temperature of the liquid crystal phase can be achieved and the operating temperature range can be widened without detriment to the ferroelectric properties of the liquid crystal compounds of the present invention.

Accordingly, display elements having high speed response over a wide temperature range can be obtained by using the above-mentioned liquid crystal compounds or liquid crystal compositions.

Further, scanning time is markedly shortened in the liquid crystal display devices prepared by using such elements as mentioned above.

The liquid crystal compounds of the present invention have spontaneous polarization. Hence, when they are charged into thin cells, there can be obtained devices having a memory effect even after an electric field is erased.

When such devices are used, power consumption can be reduced, a clear contrast can be obtained and low voltage driving can be conducted. Since such devices utilize the smectic phase of the carboxylate compounds, they can be preferably used for opticalswitching elements which are used over a wide temperature range.

The present invention is illustrated below in more detail with reference to examples, but it should be construed that the invention is in no way limited to those examples.

EXAMPLE 1

Synthesis of R-1'-trifluoromethylheptyl 4-[4'-(6'-n-decyloxy-2'-naphthoyloxy)benzoyloxy]-benzoate

First step

To a mixture of 3.01 g (8.0 mmol) of 6-decyloxynaphthalene-2-carboxylic acid, 1.80 g (8.0 mmol) of benzyl 4-hydroxybenzoate, 0.012 g (0.1 mmol) of 4-N,N-dimethylaminopyridine and 30 ml of diethyl ether was added dropwise 15 ml of diethyl ether solution containing 1.63 g (8.0 mmol) of N,N,-dicyclohexylcarbodiimide with stirring over a period of one hour while cooling with ice. Further, the mixture was reacted at room temperature for 30 hours. The reaction mixture was filtered and the filtrate was concentrated. Using column chromatography, 3.34 g (5.7 mmol) of 4'-benzyloxycarbonylphenyl 6-decyloxynaphthyl-2-carboxylate as a white solid was separated from the concentrate. Yield: 72 mol %.

Second step

Hydrogen gas was passed through a mixture of 2.93 g (5 mmol) of 4'-benzyloxycarbonylphenyl 6-decyloxynaphthyl-2-carboxylate obtained in the first step, 0.29 g of a catalyst composed of 5% palladium supported on carbon and 20 ml of tetrahydrofuran with stirring at room temperature for 20 hours.

The catalyst composed of 5% palladium on carbon was separated by filtration. The filtrate was concentrated. The concentrate was recrystallized from acetone to obtain 2.28 g (4.60 mmol) of 4,-carboxyphenyl 6-decyloxynaphtyl-2-carboxylate as a white solid. Yield: 92 mol %.

Third step

To 0.57 g (2.5 mmol) of 4-benzyloxybenzoic acid was added a large excess (2.13 ml, 25 mmol) of oxalyl chloride. The mixture was heated under reflex at 70° C. for 3 hours. After cooling, oxalyl chloride was removed under reduced pressure to obtain a white solid.

To a mixture of 0.260 g (2.0 mmol) of R-1,1,1-trifluoro-2-octanol, 1.6 ml (20 mmol) of pyridine and 50 ml of tetrahydrofran solution containing 0.012 g (0.1 mmol) of 4-N,N-dimethylaminopyridine was added dropwise 25 ml of tetrahydrofuran solution containing the while solid prepared above with stirring over a period of 20 minutes while cooling with water.

The mixture was stirred at room temperature for additional 7 hours. The reaction mixture was poured into water and the reaction product was extracted from the aqueous reaction mixture with diethyl ether. The extract was washed with water and concentrated. Using column chromatography, 0.74 g (1.9 mmol) of 1 -trifluoromethylheptyl R-4-benzyloxybenzoate as a white solid was separated from the concentrate. Yield: 94 mol %.

Fourth step

Hydrogen gas was passed through a mixture of 17.9 g (52.6 mmol) of 1'-trifluoromethylheptyl R-4-benzyloxybenzoate, 1.8 g of a catalyst composed of 5% palladium on carbon and 100 ml of ethanol with stirring at room temperature for 10 hours.

The catalyst composed of 5% palladium on carbon was separated by filtration. The filtrate was concentrated. Recrystallization of the concentrate from acetone gave 16.0 g (52.6 mmol) of 1'-trifluoromethylheptyl R-4-hydroxybenzoate as a white solid. Yield: 100 mol %.

Fifth step

To 0.34 g (0.75 mmol) of 4'-carboxyphenyl 6-decyloxynaphthyl-2-carboxylate obtained in the second step was added 0.64 ml (1.5 mmol) of oxalyl chloride. The mixture was heated under reflux at 80° C. for 5 hours. Oxalyl chloride was removed therefrom under reduced pressure to obtain a white solid.

To a mixture of 0.19 g (0.75 mmol) of 1'-trifluoromethylheptyl R-4-hydroxybenzoate obtained in the fourth step, 0.60 ml (7.5 mmol) of pyridine and 10 ml of tetrahydrofuran containing 0.012 g (0.1 mmol) of 4-N,N-dimethylaminopyridine was added dropwise 10 ml of tetrahydrofuran solution containing the white solid prepared above with stirring over a period of 10 minutes while cooling with water. The mixture was stirred for further 12 hours. The reaction mixture was poured into water. The resulting white powder was recovered by filtration and subjected to column chromatography to obtain 0.33 g of a solid with melting point of 162°–164° C.

FD-mass spectrum of this solid was measured and the solid was found to have a m/e value of 734.

FIG. 2 shows a chart of $^1$H-NMR spectrum of the compound obtained.

From this analysis, the compound was identified to be R-1'-trifluoromethylheptyl 4-[4'-(6'-n-decyloxy-2'-naphthoyloxy)benzoyloxy]-benzoate which was the desired compound. Yield: 44 mol %.

A phase transition temperature of this compound is shown below.

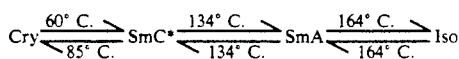

In the above, Cry represents a crystal phase, SmC. represents a chiral smectic C phase, SmA represents a smectic A phase and Iso represents an isotropic liquid.

Example 2

Synthesis of R-1'-trifluoromethylheptyl 4-[4'-(6'-n-heptyloxy-2'-naphthoyloxy)benzoyloxy]-benzoate First step To a mixture of 1.14 g (5 mmol) of 4-benzyloxybenzoic acid, 0.92 g (5 mmol) of R-1-trifluoromethyl-heptanol, 0.12 g (1 mmol) of 4-N,N-dimethylaminopyridine and 20 ml of methylene chloride was added dropwise 10 ml of methylene chloride containing 1.03 g (5 mmol) of N,N'-dicyclohexylcarbodiimide with stirring at room temperature over a period of one hour. The mixture was reacted at room temperature for 10 hours. The reaction mixture was filtered and the filtrate was concentrated. Using column chromatography, 1.75 g (4.4 mmol) of R-1'-trifluoromethylheptyl 4-benzyloxybenzoate as a crystal-clear liquid was separated from the concentrate.

Second step

Hydrogen gas was passed through a mixture of 1.58 g (4 mmol) of R-1'-trifluoromethylheptyl 4-benzyloxybenzoate obtained in the first step, 0.5 g of a catalyst composed of 5% palladium on carbon and 30 ml of ethyl acetate with stirring at room temperature under atmospheric pressure for 9 hours. The reaction mixture was filtered by using sellaite as a filter aid. The filtrate was concentrated. Using column chromatography, 1.13 g (3.7 mmol) of R-1'-trifluoromethylheptyl 4-hydroxybenzoate as a colorless viscous liquid was separated from the concentrate.

Third step

To a mixture of 243 g (8.5 mmol) of 6-n-heptyloxynaphthalene-2-carboxylic acid, 1.94 g (8.5 mmol) of benzyl 4-hydroxybenzoate, 0.012 g (0.1 mmol) of 4-

N,N-dimethylaminopyridine and 30 ml of methylene chloride was added dropwise 10 ml of methylene chloride solution containing 1.75 g (8.5 mmol) of N,N'-dicyclohexylcarbodiimide with stirring over a period of one hour while cooling with ice. The mixture was reacted at room temperature for further 12 hours.

The reaction mixture was filtered and the filtrate was concentrated. By using column chromatography, 2.72 g (5.5 mmol) of benzyl 4-(6'-n-heptyloxy-2,-naphthoyloxy)-benzoate as a white solid was separated from the concentrate.

Fourth step

Hydrogen gas was passed through a mixture of 2.33 g (4.7 mmol) of benzyl 4-(6'-n-heptyloxy-2,-naphthoyloxy)-benzoate obtained in the third step, 1.0 g of a catalyst composed of 5% palladium on carbon and 30 ml of tetrahydrofuran with stirring at room temperature under atmospheric pressure for 8 hours.

The reaction mixture was filtered by using sellaite as a filter aid and the filtrate was concentrated. Recrystallization of the concentrate from toluene gave 1.42 g (3.5 mmol) of 4-(9'-n-heptyloxy-2,-naphthoyloxy)-benzoic acid as a white solid.

Fifth step $$Cry \underset{73°\ C.}{\overset{73°\ C.}{\rightleftarrows}} SmC^* \underset{125°\ C.}{\overset{124°\ C.}{\rightleftarrows}} SmA \underset{183°\ C.}{\overset{177°\ C.}{\rightleftarrows}} Iso$$

In the above, Cry represents a crystal phase, SmC* represents a chiral smectic C phase, SmA represents a smectic A phase, and Iso represents an isotropic liquid.

Preparation of liquid crystal composition

The carboxylate compound represented by the formula (4) prepared above and the compound represented by the following formula (Cr-1) in a ratio of 51 : 49 by weight were mixed to prepare a liquid crystal composition according to the present invention.

The phase transition temperature of this composition was measured. The results are shown in Table 3. The phase transition temperature of the compound of the formula (Cr-1) is also shown in Table 3.

TABLE 3

| Compound or composition | Phase transition temperature | | | | | | |
|---|---|---|---|---|---|---|---|
| | Cry. | | SmC* | | SmA | | Iso |
| (A-1) | . | 73° C. | . | 125° C. | . | 183° C. | . |
| (A-1) 51 wt. % + (Cr-1) 49 wt. % | . | 34° C. | . | 52° C. | . | 96° C. | . |
| (Cr-1) | . | −13° C. | | | . | −6° C. | . |

In Table, (A-1) repesents the following compound.

(Cr-1) represents the following compound.

To a mixture of 0.41 g (1 mmol) of 4-(6'-n-heptyloxy-2'-naphthoyloxy)-benzoic acid obtained in the fourth step, 0.30 g mmol) of R-1-trifluoromethylheptyl 4-hydroxybenzoate obtained in the second step, 0.012 g (0.1 mmol) of 4-N,N-dimethylaminopyridine and 30 ml of methylene chloride was added dropwise 2 ml of methylene chloride containing 0.21 g (1 mmol) of N,N'-dicyclohexylcarbodiimide with stirring at room temperature for 2 hours. The mixture was reacted at room temperature for further 8 hours. The reaction mixture was filtered and the filtrate was concentrated. By using column chromatography, 0.63 g of a white solid having a melting point of 181°–183° C. was separated from the concentrate.

The mass spectrum of this solid was measured and the solid was found to have a m/e value of 692. FIG. 3 shows a chart of $^1$H-NMR spectrum of the compound obtained. From this analysis, the compound was identified to be R-1'-trifluoromethylheptyl 4-[4'-(6'-n-heptyloxy-2'-naphthoyloxy) benzoyloxy]-benzoate which was the desired compound. Yield: 88 mol %.

A phase transition temperature of this compound is shown below.

Synthesis of R-1'-trifluoromethylheptyl 4-[4'-(6'-n-hexadecyloxy-2'-naphthoyloxy)benzoyloxy]-benzoate First step To a mixture of 4.94 g (12 mmol) of 6-n-hexadecyloxynaphthalene-2-carboxylic acid, 2.74 g (12 mmol) of benzyl 4-hydroxybenzoate, 0.12 g (1 mmol) of 4-,N-N-dimethylaminopyridine and 40 ml of methylene chloride was added dropwise 12 ml of methylene chloride solution containing 2.48 g (12 mmol) of N,N'-dicyclohexylcarbodiimide with stirring over a period of 2 hours while cooling with ice. The mixture was reacted at room temperature for further 12 hours.

The reaction mixture was filtered and the filtrate was concentrated.

Using column chromatography, 3.73 g (6.0 mmol) of benzyl 4-(6'-n-hexadecyloxy-2'-naphthoyloxy)-benzoate as a solid was separated from the concentrate.

Second step

Hydrogen gas was passed through a mixture of 3.04 g (4.9 mmol) of benzyl 4-(6'-n-hexadecyloxy-2'-naphthoyloxy)-benzoate obtained in the first step, 1.5 g of a catalyst composed of 5% palladium on carbon and 50 ml of ethyl acetate with stirring at room temperature under atmospheric pressure for 8 hours. The reaction mixture was filtered by using sellaite as a filter aid and the filtrate was concentrated. From the concentrate, 2.51 g of 4-(6'-n-hexadecyloxy-2'-naphthoyloxy)benzoic acid was obtained as a solid.

Third step

To a mixture of 0.53 g (1 mmol) of 4-(6'-n-hexadecyloxy-2'-naphthoyloxy)benzoic acid obtained in the second step, 0.30 g (1 mmol) of R-1'-trifluoromethylheptyl 4-hydroxybenzoate obtained in the second step of Example 2, 0.012 g (0.1 mmol) of 4-N,N-dimethylaminopyridine and 30 ml of methylene chloride was added dropwise 2 ml of methylene chloride solution containing 0.21 g (1 mmol) of N,N'-dicyclohexylcarbodiimide with stirring at room temperature over a period of one hour. The mixture was reacted for further 12 hours. The reaction mixture was filtered and the filtrate was concentrated. Using column chromatography, 0.45 g of a solid having a melting point of 134.0°–134.5° C. was obtained from the concentrate.

FD-mass spectrum of this solid was measured and this solid was found to have a m/e value of 818.

FIG. 4 shows a chart of $^1$H-NMR spectrum of the compound obtained.

From the analysis, the compound was identified to be R-1'-trifluoromethylheptyl 4-[4'-(6'-n-hexadecyloxy-2'-naphthoyloxy)benzoyloxy]-benzoate which was the desired compound. Yield: 54 mol %.

A phase transition temperature of the compound is shown below.

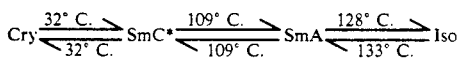

In the above, Cry represents a crystal phase, SmC* represents a chiral smectic C phase, SmA represents a smectic A phase, and Iso represents an isotropic liquid.

Example 4

The liquid crystal composition obtained in Example 2 was charged into a cell as shown in FIG. 1 to prepare a liquid crystal element.

The operating temperature of the thus-obtained liquid crystal element was in the range of from 96° to 34° C. and contrast was stable in this temperature range.

Example 5

The carboxylate compound (A-1) prepared in Example 2 was molten and charged (injected) into a gap of a cell, said gap being under reduced pressure and said cell being composed of two transparent substrates, each substrate being provided with a transparent electrode thereon and an orientation-controlling film (thickness: 150 Å) composed of a polyimide (PIQ-5400, a product of Hitachi Kasei Kogyo KK) on the inner surface thereof as shown in FIG. 1. Said polyimide film was rubbed so that orientation directions were nearly parallel but in the opposite direction from each other.

After the liquid crystal material was charged, the cell was heated to 185° C., kept at 185° C. for 5 minutes and cooled at a rate of 1° C./min to 80° C. to prepare a liquid crystal element.

The contrast of the liquid crystal element was measured. The contrast was 35.

The above cell was prepared in the following manner.
Cell condition:
  (a) External size: 2.5 cm long × 2.2 cm wide × 1.5 mm thick
  (b) Substrate: 0.7 mm thick, material: glass
  (c) Distance between substrates: 2 μm
  (d) Sidewall size: 1.8 cm long × 0.1 cm wide × 2 μm thick Polyimide coating was conducted on a glass substrate with ITO transparent electrode film. That is, the polyimide (PIQ-5400, a product of Hitachi Kasei Kogyo KK) was coated with the ITO transparent electrode by spin coating method. The polyimide was diluted with N-methylpyrrolidone to a 1.2% solution which was then spin-coated at 2,000 rpm. The polyimide solution thus coated was cured by heating at 325° C. for 30 minutes, whereupon a polyimide film of 150 to 200 Å in thickness was formed. The polyimide film was then rubbed with a nylon cloth in one direction, thereby imparting an ability of orientating the liquid crystal thereto.

Two sheets of the thus-prepared polyimide film coated glass substrates were put upon each other to prepare a cell for evaluation. An epoxy adhesive was applied to one of the polyimide film-coated glass substrates by means of silk screen printing so that two substrates were bonded to each other and a gap of the cell was controlled. The epoxy adhesive was prepared by mixing an adhesive base (LCB-304b, a product of EHC) with a curing agent (LCB-310B, a product of EHC) and beads (GP-20, a product of EHC) for controlling cell gap in the proportion of 138:30:3. One of the glass substrates mentioned above was coated with the epoxy adhesive and laminated to other glass substrate in such a manner that the polyimide films faced each other. The adhesive thus coated was cured under such curing conditions that heating was conducted at 50° C. for 15 minutes, at 60° C. for 15 minutes, at 70° C. for 15 minutes, at 80° C. for 15 minutes, at 125° C. for 30 minutes and at 170° C. for 60 minutes.

The thus-prepared cell for evaluation had a gap of about 2 μm. The liquid crystal material was evaluated by using this cell.

In the present invention, contrast was determined by placing the liquid crystal element between polarizers at right angles to each other, rotating the liquid crystal element, measuring the intensity of transmitted light in the light state and in the dark state and calculating the ratio of I (light state)/I (dark state).

Example 6

The procedure of Example 5 was repeated except that the cooling rate was 0.1° C./min to obtain a liquid crystal element.

The contrast of the liquid crystal element was 50.

Example 7

The procedure of Example 5 was repeated except that the composition in the step "preparation of liquid crystal composition" in Example 2 was used in place of the carboxylate compound and the cooling rate was 1° C./min to prepare a liquid crystal element.

The contrast of this liquid crystal element was 46.

Example 8

The procedure of Example 5 was repeated except that the rubbing directions (orientation directions) of two sheets of the orientation controlling films were parallel to each other and in the same direction and the cooling rate was 10° C./min to prepare a liquid crystal element.

The contrast of the liquid crystal element was 6.

Example 9

The procedure of Example 5 was repeated except that the cooling rate was 10° C./min to obtain a liquid crystal element.

It was found that the contrast was apt to be somewhat lowered because of rapid cooling rate.

What is claimed is:

1. A liquid crystal compound which is a carboxylate compound represented by formula (A)

$$R^1-\text{[naphthalene]}-COO-\text{[phenylene]}-COO-\text{[phenylene]}-COO\overset{H}{\underset{CF_3}{C^*}}-R^2 \quad [A]$$

wherein $R^1$ is an alkoxy group of from 6 to 18 carbon atoms;
$R^2$ represents a group of following formula (C):

$$-(CH_2)_n-COOR^3 \quad (C)$$

n is an integer of 1 to 3, and $R^3$ represents an alkyl group having 1 to 10 carbon atoms or halogenated alkyl group having 1 to 10 carbon atoms.

2. The liquid crystal compound of claim 1 wherein n is 1 and wherein $R^3$ represents an ethyl group.

3. The liquid crystal compound of claim 16 wherein the naphthalene group is 2,6-naphthalene, and each of the phenylene groups is p-phenylene.

4. The liquid crystal compound of claim 1 wherein the naphthalene group is 2,6-naphthalene, and each of the phenylene groups is p-phenylene.

5. The liquid crystal composition of claim 6 wherein in the carboxylate compound of formula (A) the naphthalene group is 2,6-naphthalene, and each of the phenylene groups is p-phenylene.

6. A liquid crystal composition comprising at least one carboxylate compound represented by formula (A) as set forth in claim 1, and at least one liquid crystal compound other than the at least one carboxylate compound of formula (A).

7. The liquid crystal composition of claim 6 wherein in the carboxylate compound of formula (A) the naphthalene group is 2,6-naphthalene, and each of the phenylene groups is p-phenylene.

8. A liquid crystal composition comprising 1-99% by weight of the carboxylate compound represented by formula (A) as set forth in claim 1, and 99-1% by weight of another liquid crystal compound other than the at least one carboxylate compound of formula (A) and which is capable of assuming a chiral smectic phase.

9. The liquid crystal composition as claimed in claim 6 wherein the amount of the carboxylate compound represented by formula (A) is 5-75% by weight.

10. A liquid crystal element comprising a cell composed of two transparent substrates, each substrate being provided with a transparent electrode on one surface thereof, and a liquid crystal material, said substrates being arranged so that the transparent electrodes are faced to each other with a gap, and the gap being filled with said liquid crystal material, characterized in that an orientation controlling film is provided on the inner surface of at least one substrate and said liquid crystal is the carboxylate compound represented by formula A as set forth in claim 1.

11. A liquid crystal element comprising a cell composed of two transparent substrates, each substrate being provided with a transparent electrode on one surface thereof, and a liquid crystal material, said substrates being arranged so that the transparent electrodes are faced to each other with a gap, and the gap being filled with said liquid crystal material, characterized in that an orientation controlling film is provided on the inner surface on each of said two transparent substrates, the orientation directions of said two sheets of the orientation controlling film is provided on the inner surface on each of said two transparent substrates, the orientation directions of said two substrates of the orientation controlling films are nearly parallel to each other but in the opposite direction from each other and said liquid crystal material is the carboxylate compound represented by formula (A) as set forth in claim 1.

$$H_{33}C_{16}O-\text{[naphthalene]}-\underset{O}{\overset{}{C}}O-\text{[phenylene]}-\underset{O}{\overset{}{C}}O-\text{[phenylene]}-\underset{O}{\overset{}{C}}O-\underset{CF_3}{\overset{H}{C^*}}-CH_2\underset{O}{\overset{}{C}}OCH_2CH_3$$

$$H_{21}C_{10}O-\text{[naphthalene]}-\underset{O}{\overset{}{C}}O-\text{[phenylene]}-\underset{O}{\overset{}{C}}O-\text{[phenylene]}-\underset{O}{\overset{}{C}}O-\underset{CF_3}{\overset{H}{C^*}}-CH_2\underset{O}{\overset{}{C}}OCH_2CH_3$$

$$H_{17}C_8O-\text{[naphthalene]}-\underset{O}{\overset{}{C}}O-\text{[phenylene]}-\underset{O}{\overset{}{C}}O-\text{[phenylene]}-\underset{O}{\overset{}{C}}O-\underset{CF_3}{\overset{H}{C^*}}-CH_2\underset{O}{\overset{}{C}}OCH_2CH_3$$

and $$H_{15}C_7O-\text{[naphthalene]}-\underset{O}{\overset{}{C}}O-\text{[phenylene]}-\underset{O}{\overset{}{C}}O-\text{[phenylene]}-\underset{O}{\overset{}{C}}O-\underset{CF_3}{\overset{H}{C^*}}-CH_2\underset{O}{\overset{}{C}}OCH_2CH_3.$$

12. The liquid crystal element as claimed in claim 10 or 11; wherein said orientation controlling film is composed of a polyimide.

13. A process for the preparation of a liquid crystal element comprising a cell composed of two transparent substrates, each substrate being provided with a transparent electrode on one surface thereof, and a liquid crystal material, said substrates being arranged so that the transparent electrodes are faced to each other with a gap, and the gap being filled with said liquid crystal material, which process is characterized in that an orientation controlling film is provided on the inner surface of each of said two transparent substrates in such a manner that the orientation directions of the orientation controlling films are nearly parallel to each other but in the opposite direction from each other, a liquid crystal compound component comprising the carboxylate compound represented by formula (A) as set forth in claim 1 is charged into aid gap of the cell, the liquid crystal compound contained in the cell is heated to not lower than a temperature at which said compound exhibits an isotropic liquid and said compound is then cooled at a cooling rate of 2° C./min. or below to not higher than a temperature at which said compound exhibits a liquid crystal.

14. The process for the preparation of a liquid crystal element as claimed in claim 13 wherein said cooling rate is 0.1° to 0.5° C./min.

15. The process for the preparation of a liquid crystal element as claimed in claim 13 wherein said orientation controlling film is composed of a polyimide.

16. The process for the preparation of a liquid crystal element according to claim 13 wherein the cooling rate is in the range of 0.1° to 2.0° C./min.

* * * * *